United States Patent
Fergason et al.

[15] 3,657,538
[45] Apr. 18, 1972

[54] METHOD AND APPARATUS FOR DETECTING X-RAY RADIATION USING A CHOLESTERIC DETECTOR

[72] Inventors: James L. Fergason, Kent, Ohio; Newton N. Goldberg, Pittsburgh, Pa.

[73] Assignee: Westinghouse Electric Corporation, Pittsburgh, Pa.

[22] Filed: Aug. 22, 1968

[21] Appl. No.: 754,582

[52] U.S. Cl.....................250/83, 204/158, 250/65, 260/397.2
[51] Int. Cl............................................G01f 1/08
[58] Field of Search..................250/83 CD, 88, 213 VT, 65; 260/397.2; 204/158

[56] References Cited

UNITED STATES PATENTS 3,114,836  12/1963  Ferguson et al. ....................250/83

FOREIGN PATENTS OR APPLICATIONS 1,041,490  9/1966  Great Britain.....................250/83 CD Primary Examiner—Archie R. Borchelt
Assistant Examiner—Morton J. Frome
Attorney—F. Shapoe and Alex Mich, Jr.

[57] ABSTRACT

Increasing dosages of X-ray radiation progressively lower the color-play range of cholesteric-phase liquid-crystal materials. The effect is enhanced when an effective amount of an iodine-containing compound is used in the liquid-crystal material. Novel iodine-containing compounds are described, and articles are disclosed that give direct-reading indication of the dosages of X-ray radiation that they have received, without need for a separate development operation.

23 Claims, 2 Drawing Figures

3,657,538

Patented Apr 18 1972

WITNESSES:
Leon M. Garman
James T. Young

INVENTORS
James L. Fergason and
Newton N. Goldberg.
BY Alex Mich Jr.
ATTORNEY

METHOD AND APPARATUS FOR DETECTING X-RAY RADIATION USING A CHOLESTERIC DETECTOR

BACKGROUND OF THE INVENTION

1. Field of the Invention

This invention relates to a method of detecting the dosage of X-ray radiation. It is based upon observing the degree to which a shift in the color-play temperature range of a cholesteric-phase liquid-crystal material has taken place. It relates further to the improvement that is obtained in such method whenever there is present in the liquid-crystal material an effective amount of a suitable iodine-containing compound. If further encompasses novel iodine-containing compounds suitable for use in practicing such improvement, as well as to articles of manufacture in the nature of self-developing X-ray dosimeters that operate in accordance with the method in general or the above-mentioned improvement.

2. Description of the Prior Art

Many materials are known that exhibit cholesteric-phase liquid-crystal materials within a certain temperature range. See, for example, the compositions mentioned in U.S. Pat. No. 3,114,836 in the passage from column 6, line 61 to column 7, line 21. See also, for example, the compositions mentioned in British Pat. No. 1,041,490 in the passage from line 5 to line 102 of page 4.

As mentioned in the above patents, cholesteric-phase liquid-crystal compositions have numerous interesting properties, one of which is that these compositions have a color-play temperature range within which they exhibit noticeable changes in color, generally as the result of relatively small changes in temperature. As a result of selective scattering, when these cholesteric-phase liquid-crystal materials are placed in the form of a thin film upon a suitable substrate, such as polyethylene terephthalate film provided with a suitable black background, there is a color-play temperature range that starts at a lower temperature, at which a red color is observed, and ends at another temperature, perhaps 10°–100° C higher, at which, after having passed through the other colors of the visible spectrum, the material exhibits a blue or violet color that verges into the black. At temperatures above and below the color-play temperature range, black is observed. So far as was known prior to the present invention, the color-play temperature range was dependent upon the chemical composition of the cholesteric-phase liquid-crystal material used. No way was known of modifying or adjusting the color-play temperature range, other than changing the composition.

Devices for detecting the quantity of X-ray radiation incident thereon have, before this invention, comprised films containing X-ray sensitive material, with it being necessary that the film be subjected to a separate developing operation before the quantity of X-ray radiation that it has received can be determined. X-ray dosimeters using such film are being built and used, despite the fact that the need for such a separate development operation makes the use of such dosimeters not only more inconvenient but also substantially more costly than the use of a direct-reading dosimeter, such as may be obtained with the present invention.

BRIEF SUMMARY OF THE INVENTION

By the action of X-ray radiation about a thin film of cholesteric-phase liquid-crystal material, the color-play temperature range is shifted downwardly by a suitable amount, such as about 1°–10° C. Within limits, greater dosages of X-ray radiation cause greater shifts in the color-play temperature range. Cholesteric-phase liquid-crystal materials containing iodine display this shift more markedly than other known cholesteric-phase liquid-crystal materials do, so that the use of such compounds is preferred whenever greater sensitivity is desired. Novel iodine-containing cholesteric-phase liquid-crystal materials are described. The shift in the color-play temperature range is irreversible. Thus, by purposely irradiating a film with a preselected dosage of radiation, the color-play temperature range that it exhibits can be changed by an appropriate amount to suit requirements. Moreover, if an irradiated film is maintained at a proper temperature, it will be possible to determine the dosage of X-ray radiation that it has received from the color that it exhibits, so that there is obtained, in effect, a self-developing X-ray dosimeter.

BRIEF DESCRIPTION OF THE DRAWINGS

A complete understanding of the invention may be had from the foregoing and following description thereof, taken together with the appended drawings, in which.

DESCRIPTION OF THE PREFERRED EMBODIMENTS

Figure 2:
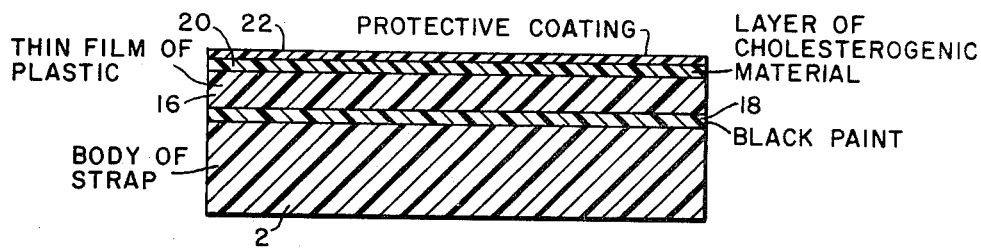
FIG. 2 is a sectional view, taken along the line II—II of FIG. 1.

In one general aspect, the present invention concerns a method for detecting X-ray radiation that comprises preparing a composition that contains at least an effective amount of a compound that exhibits liquid crystals of the cholesteric phase, with the composition being of such nature, as respects the temperature range within which it exhibits a color play that, considering the amount of cholesterogenic material present therein and the approximate temperature of intended use, as well as the intensity and duration of the X-ray radiation that is to be detected, there is obtained, whenever the composition is exposed to X-ray radiation of the intensity, wavelength, and duration intended to be detected, a noticeable change in the color of the composition. To this end, the composition is prepared by being put into a suitable physical form, such as being made into a film having a thickness of about 5–50 microns disposed on a suitable substrate, such as a plastic film of polyethylene terephthalate provided with a background coating of black paint or the like.

Herein, the term "cholesterogenic material" is used to refer to any compound or mixture of compounds that can be made to exhibit cholesteric-phase liquid crystals. The term "iodine-containing cholesterogenic material" is used to refer both to compounds or mixtures of compounds that contain iodine substituted onto the cholestanol or cholesterol itself, and to compounds wherein iodine is present in the side chain or acid moiety of a cholesteryl or cholestanyl ester, but not to materials comprising, e.g., colloidal iodine suspended in cholesterogenic material.

In accordance with the preferred aspect, the present invention concerns a method of detecting X-ray radiation wherein there is prepared a composition that contains at least an effective amount of an iodine-containing cholesterogenic material. As illustrated hereinbelow, such iodine-containing cholesterogenic material is substantially more sensitive to X-ray radiation, exhibiting for a given dosage of radiation a substantially greater shift in its color-play temperature range.

When iodine-containing cholesterogenic material is used in the above method, the iodine-containing compound used may be one that is itself already known, such as 3-iodocholestane, 5-iodocholestanol, 6-iodocholestanol, 5,6-iodocholestanol, 3,5,6-tri-iodocholestane, or 3-iodocholesterol, the last of these sometimes also being called cholesteryl iodide.

The iodine-containing compound may also be a compound not itself hitherto known, such as an aliphatic, alicyclic, aromatic or unsaturated mono- or di-basic acid ester of 5-iodocholestanol, 6-iodocholestanol, or 5,6-di-iodocholestanol. When the acid is unsaturated, iodine might also be introduced into the side chain at the point of saturation, as in the making of 5,6-di-iodocholestanyl-9,10-di-iodostearate from cholesteryl oleate.

Other new compounds coming within the purview of the invention are the carbonates that contain, in addition to suitable alkyl, aryl or alkaryl groups, a molecule portion that is cholesterogenic and contains iodine. Examples of material of this kind include 5-iodocholestanyl amyl carbonate, 6-iodocholestanyl phenyl carbonate, and 5,6-di-iodocholestanyl tolyl carbonate. If the alkyl, aryl or alkaryl group is unsaturated, other iodine-containing derivatives can be prepared. An example is the use of cholesteryl oleyl carbonate to prepare 5,6-di-iodocholestanyl-9,10-di-iodostearyl carbonate.

As those familiar with this art will appreciate, the difference between cholesterol and cholestanol is that the former is unsaturated and the latter is saturated between the carbon atoms Nos. 5 and 6 of the structure of each.

The manner of preparing the known compounds is, of course, known to those skilled in the art, comprising essentially the treatment of cholestanol or cholesterol, suspended in a suitably unreactive organic solvent such as benzene, with an iodizing agent such as phosphorus pentiodide or triiodide, hydriodic acid, or iodine crystals. In most instances, the reaction proceeds smoothly at room temperature or at a moderately elevated temperature such as 80° C.

The most instances, the iodine-containing product is substantially less soluble in the organic solvent than the cholesterogenic material reacted, so that it may be recovered from the organic solvent by filtration. In certain cases, it is desirable or necessary to distill off a portion of the organic solvent, to increase the quantity of iodine-containing cholesterogenic product material recovered. To be more specific, the 3-iodocholestane is made by using phosphorus pentiodide, and 5-iodocholestanol and 6-iodocholestanol may be made with the use of dry hydriodic acid. The 5,6-di-iodocholestanol and 3,5,6-triiodocholestane mentioned above are made by using iodine crystals.

The novel iodocholestanyl esters of aliphatic, alicyclic, aromatic or unsaturated mono- or di-basic acids are made by reacting the corresponding iodocholestanol or di-iodocholestanol with the appropriate acid. A suitable organic solvent, such as benzene, and a suitable esterification catalyst, such as concentrated sulphuric acid, are used. Alternatively, it may in certain instances be possible to prepare the iodocholestane in situ, by bringing cholesterol into contact at one time with both the iodizing agent and the acid with which the alcohol is to be esterified. It may also prove possible, in certain instances, to prepare the ester first from iodine-free cholesterogenic materials and then iodize it.

The novel iodine-containing cholestanyl esters and carbonates have the structural formula

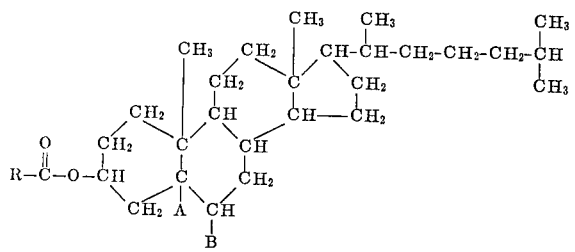

where A and B are elements selected from the group consisting of hydrogen and iodine and
R is a radical selected from the group consisting of the aryl, iodoaryl, alkyl, iodoalkyl, alkaryl, iodoalkaryl, aralkyl, and iodoaralkyl radicals containing one to 27 carbon atoms and the aryloxy, iodoaryloxy, alkoxy, iodoalkoxy, alkaryloxy, iodoalkaryloxy, arylalkoxy, and iodoarylalkoxy radicals containing one to 27 carbon atoms,
the compound containing at least one iodine atom.

The preparation of the novel iodocholestanyl iodoesters proceeds from suitable starting materials, such as cholesterol, iodine and oleic acid, in accordance with reaction techniques familiar to those skilled in the art. Consider, for example, the following Example I:

EXAMPLE I

To 1 mol of oleic acid, there is added 1 mol of iodine in benzene. When the solution becomes colorless, indicating complete absorption of the iodine by the oleic acid to form 9,10-di-iodostearic acid, there is added 1 mol of thionyl chloride and 10 cubic centimeters of dimethyl formamide. The mixture is allowed to stand for 1 hour. In a separate flask, meanwhile, 1 mol of cholesterol is reacted with 1 mol of hydriodic acid to produce 5-iodocholestanol. Then there are added to the reaction mixture in the first vessel or flask, 1 mol of 5-iodocholestanol and 2 mols of pyridine. Pyridine hydrochloride is removed by filtration, and then methyl alcohol is added until a white crystalline precipitate forms, which is the product. The product is worked up in accordance with the conventional procedures and is characterized as 5-iodocholestanol-9,10-di-iodostearate in a yield of over 70 percent, based upon the quantity of cholesterol charged.

The preparation of an iodocarbonate in accordance with the present invention is illustrated by the following Example II:

EXAMPLE II

To 1 mol of oleyl alcohol, there is added 1 mol of iodine dissolved in carbon tetrachloride. When the solution is colorless, indicating that all the iodine has been absorbed by the oleyl alcohol to form 9,10-di-iodostearyl alcohol, there is added 1 mol of 5-iodocholestanyl chloroformate in 5,000 cubic centimeters of benzene and 100 cubic centimeters of pyridine. (The 5-iodocholestanyl chloroformate is made by reacting hydriodic acid with cholesterol and then reacting the resultant 5-iodocholestanol with phosgene in the presence of pyridine.) The mixture is stored without heating for 1 hour. The mixture is then filtered to remove pyridine hydrochloride and to the filtrate, methyl alcohol is added until there is formed a white crystalline precipitate, which is the product. This is worked up in the usual manner: filtration, washing with methanol, and drying. By customary methods, the product is characterized as 5-iodocholestanyl-9,10-di-iodostearyl carbonate, in the yield of better than 80 percent, based upon the quantity of iodocholestanyl chloroformate charged.

As can be seen from the foregoing Example II, the invention further comprises certain iodine-containing cholesterogenic alkyl, aryl, or alkaryl carbonates mentioned above.

Although it will prove possible in some instances to use one of the iodine-containing cholesterogenic materials mentioned above itself, alone or admixed with others of the above-named iodine-containing cholesterogenic materials, for the detection of X-ray radiation, it will be preferably in most instances to use such iodine-containing material as an additive to a composition composed principally of other cholesterogenic materials. Whether the iodine-containing cholesterogenic material is used by itself, or is admixed with other cholesterogenic materials of better known characteristics, the procedure is the same. The cholesterogenic materials are suspended in benzene, petroleum ether, or other suitable organic solvent, to form a liquid that can be applied to a suitable substrate, with the organic solvent being permitted to evaporate to leave a thin film, such as about 5–50 microns thick. In many instances, an iodine-containing cholesterogenic material sensitive to X-ray radiation does not itself have a color-play temperature range suitable for the intended use. Suitable color changes indicating that a film has been exposed to X-ray radiation are not obtained at temperatures far removed from those at which the cholesterogenic material customarily exhibits its color of play. Moreover, cholesterogenic materials differ, not only in respect to the temperature at which the color play takes place, but also in respect to the width of the temperature range over which color change takes place (this may be only 2° or 3° C, or as much as 25° or 100° C) and in respect to the rapidity with which the material responds to an influence (some respond almost instantly, and others take hours). It is fortunate, therefore, that the various above-mentioned compound may be blended with other cholesterogenic materials of known performance as respects these properties. Substantial color-changing effects can be obtained with, for example, about 1-10 percent of an iodine-containing cholesterogenic material blended with a suitable base composition of other cholesterogenic materials, such as a base composition comprising a mixture of 40 percent by weight each of oleyl cholesteryl carbonate and cholesteryl nonanoate with 20 percent by weight of dicholesteryl sebacate, which exhibits a color play in the temperature range of about 30°–40° C. Moreover, this base composition is one that is relatively sluggish in changing color, as is desirable for applications such as the making of dosimeters for the detection of radiation in the frequency range of $10^{17}$ to $10^{20}$ cycles per second.

A dosimeter in accordance with the invention may comprise simply a short piece of plastic film, painted black on one side and coated on the other side with the film about 5–50 microns thick, made by applying a suitable cholesterogenic material solution to the film and permitting the solvent to evaporate therefrom, and then preferably applying another transparent protective film thereover to exclude contaminants and the like. The piece of plastic film is strapped to the wearer's wrist or taped to his forehead or otherwise placed in close contact with a part of his body, in order that variations in temperature to which the dosimeter is exposed may be minimized. Thus, observed color changes may be attributed to the quantity of X-ray radiation received by the dosimeter.

Figure 1:
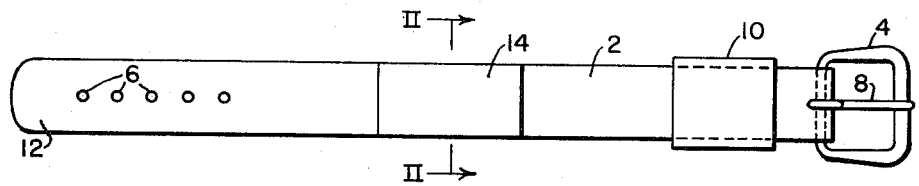
FIG. 1 is a plan view of an X-ray dosimeter in accordance with the invention.

Accordingly, in accordance with one embodiment of the invention, reference being made to the attached FIGS. 1 and 2, there is provided an X-ray dosimeter comprising a strap 2 having at one end a buckle 4 and in its body near the other end a plurality of holes 6, into which the finger 8 of the buckle 4 may be fitted. There is also provided a sleeve 10 to receive the portion 12 of the strap after it has been fitted, for example, to the wearer's wrist. There is provided, moreover, a region 14, that serves as the sensitive element of the dosimeter and contains cholesterogenic material.

With particular reference to FIG. 2, it will be seen that in the region 14, there is secured to the body of the strap 2, by adhesive or other suitable means (not shown), a thin film of plastic 16, preferably of polyethylene terephthalate or the like, upon which there has been provided on one side a coating 18 of black paint or the like (a black spray paint may be used, although carbon black or other black material is also suitable) and on the other side of which there is provided a very thin (5–50 microns) layer 20 of cholesterogenic material, preferably iodine-containing cholesterogenic material. Above the layer 20 is a layer 22 comprising a plastic protective coating to keep contaminants and the like from entering the layer 20. The layer 22 is, of course, suitable light-transmitting, being translucent or transparent. For the layer 22, transparent nail polish or the like may be used.

As an alternative, the cholesterogenic material is microencapsulated in transparent protective material.

A dosimeter of the kind indicated above is used by being strapped to the wearer's wrist or otherwise placed into contact with a portion of the wearer's body (or otherwise being provided with an environment of substantially constant temperature), so that, when X-ray radiation becomes incident thereon, there will be a change in observed color that is indicative of the dosage of X-ray radiation incident upon the dosimeter.

It is to be understood, of course, that the extent to which a color change is observed will depend upon the nature of the cholesterogenic material used, the temperature environment of the dosimeter, and the dosage of X-ray radiation. Consider, for example, a cholesterogenic material that has a color-play temperature range, when unirradiated, of from 23° C (red) to 31° C (blue). The material exhibits green at 26° C. If, for example, the color-play temperature range is shifted downwardly, using X-ray radiation of a given degree of intensity, by 1° C after 10 minutes of exposure, 3° C after 1 hour of exposure, and 10° C after 5 hours of exposure, it will in many instances be possible to say, if the temperature environment of the dosimeter is known, the dosage of X-ray radiation that it has received, simply from an observation of the color that it exhibits. For example, when a dosimeter containing a cholesterogenic material having the above-indicated response to X-ray radiation of given intensity is maintained at 20° C, the observed color is black until about 1 hour of exposure, at which time the observed color is red. With about 2 ½ hours total exposure, the observed color is green.

The exact manner of building X-ray dosage indicators in accordance with the invention will be apparent to those skilled in the art from the following further specific examples relating to the performance of specific cholesteric-phase liquid-crystal materials in the presence of X-ray radiation:

EXAMPLE III

There was prepared on a substrate of glass a thin film of cholesteric-phase liquid-crystal material that comprised, in percent by weight, 55 percent cholesteryl nonanoate, 35 percent oleyl cholesteryl carbonate, and 10 percent cholesteryl benzoate. Before having been irradiated with X-rays, this material exhibited a color-play temperature range of from 23° C (red) to 31° C (blue), with the color green being exhibited at 26° C. When placed on a glass substrate provided with a suitable black background, as by spraying with black spray paint, and then irradiated, using a Norelco X-ray diffraction unit with a copper target and a beryllium window, at 35,000 electron volts and 20 milliamperes, there was obtained after an exposure of 10 minutes, a film that exhibited green at 25° C, red at 22° C, and blue at 30° C, i.e., a downward shift of 1° in the color-play temperature range of the material. After 1 hour of exposure, the downward shift in color-play temperature range was 3° C, and after 5 hours of exposure, the shift was 10° C (red at 13° C, green at 16° C and blue at 21° C).

EXAMPLE IV

Example III was repeated, except that there was used, as the cholesterogenic material, a mixture consisting of, in percent by weight, 22 percent cholesteryl chloride, 11 percent cholesteryl nonanoate, and 67 oleyl cholesteryl carbonate. When used as a thin film and in unirradiated form, this material was "temperature-insensitive," i.e., it exhibited a green iridescent color at room temperature and at other temperatures up to 47° C, at which temperature the material cleared, so that black was observed. In X-ray radiation tests, the above-mentioned material became clear after 10 minutes of exposure to X-ray radiation as mentioned above in Example III, at room temperature (25° C).

EXAMPLE V

Example IV was repeated, except that there was used a mixture consisting of 22 percent cholesteryl chloride, 6 percent cholesteryl nonanoate, and 72 percent oleyl cholesteryl carbonate. This was also a "temperature-insensitive" material, with a clearing temperature of 44° C. At room temperature, after 10 minutes of exposure to radiation as mentioned above in Example III, black was observed.

EXAMPLE VI

Example III was repeated, except that there was used a material consisting of 20 percent cholesteryl bromide, 20 percent cholesteryl nonanoate, and 60 percent oleyl cholesteryl carbonate. This was also a "temperature-insensitive" material, being green at room temperature and at temperatures up to 42° C, the clearing temperature. After 10 minutes of exposure to X-ray radiation as mentioned above in Example III, black was observed.

EXAMPLE VII

Example III was repeated, except that there was used as the mixture of cholesterogenic material a mixture of 55 percent cholesteryl nonanoate, 35 percent oleyl cholesteryl carbonate, and 10 percent of cholesteryl 4-iodobenzoate. This was a temperature-sensitive material, exhibiting a color play over a range of about 24°–32° C, with green being observed at 27° C. After irradiation with X-rays of the same intensity as used in Example III, the temperature for green was reduced to 26° C after 1 minute and to 19° C after 10 minutes. Comparison of these results with Example III reveals that with the iodine-containing cholesterogenic material of the example, an X-ray dosage detection means of substantially greater sensitivity is obtained. With the material of Example III, 10 minutes of exposure lowered the temperature for green by 1° C, but with the iodine-containing cholesterogenic material of the example, the temperature for green was lowered by 8° C.

EXAMPLE VIII

Example III was repeated, except that there was used as the cholesterogenic material a mixture consisting of 15 percent cholesteryl nonanoate, 60 percent oleyl cholesteryl carbonate, 10 percent cholesteryl 4-iodobenzoate and 15 percent cholesteryl chloride. This was a "temperature-insensitive" material, being green at room temperature and clearing at 45° C. After exposure to radiation as indicated in Example III at room temperature for 6 to 7 minutes, black was observed.

Although it will in most instances be preferably to have a dosimeter maintained in an environment of constant temperature so that there is an immediate indication, from the color exhibited, of the dosage of X-ray radiation received, it will also be possible not to provide such an environment during exposure to X-rays, but only afterward, as a kind of "development" of the exposed film. Such "development" is, of course, quicker and more convenient than the conventional development of X-ray sensitive film, and is possible because of the irreversible nature of the changes in the cholesterogenic material that is caused by exposure to such radiation. The invention may also find use in the making of X-ray pictures of objects, with a film of cholesterogenic material replacing the conventional X-ray film. Again, the constant temperature environment may be provided either during the irradiation or thereafter.

While we have shown and described herein certain embodiments of our invention, we intend to cover as well any change or modification therein which may be made without departing from its spirit and scope.

We claim as our invention:

1. A method of providing an indication of exposure to electromagnetic radiation having a frequency in the range of $10^{17}$ to $10^{20}$ cycles per second comprising the steps of (1) exposing to said radiation a layer of cholesterogenic material exhibiting cholesteric-phase liquid crystals and containing an iodine compound and (2) detecting the color of said material.

2. The method of claim 1 wherein the layer has a thickness of 5–50 microns.

3. The method of claim 2 wherein the step of detecting color is at constant temperature.

4. The method of claim 2 further characterized by the step of maintaining said layer at constant temperature.

5. The method of claim 2 wherein the color is observed against a black background.

6. The method of claim 2 wherein a change in color is an indication of the dosage of said radiation.

7. The method of claim 2 wherein said iodine compound is a derivative of a compound selected from the group consisting of cholesterol and cholestanol.

8. The method of claim 7 wherein said cholesterogenic material comprises an admixture including oleyl cholestery carbonate.

9. The method of claim 2 wherein said iodine compound has the formula

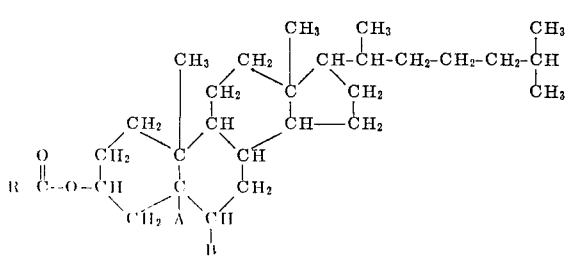

where A and B are elements selected from the group consisting of hydrogen and iodine and R is a radical selected from the group consisting of the aryl, iodoaryl, alkyl, iodoalkyl, alkaryl, iodoalkaryl, aralkyl, and iodoaralkyl radicals containing one to 27 carbon atoms and the aryloxy, iodoaryloxy, alkoxy, iodoalkoxy, alkaryloxy, iodoalkaryloxy, arylalkoxy, and iodoarylalkoxy radicals containing one to 27 carbon atoms, said compound containing at least one iodine atom.

10. The method of claim 2 wherein said iodine compound is selected from the group consisting of 3-iodocholestane; 5-iodocholestanol; 6-iodocholestanol; 5,6-di-iodocholestanol; 3,5,6-tri-iodocholestane; 3iodocholesterol, 5,6-di-iodocholestanyl-9,10-di-iodostearate; 5-iodocholestanyl amyl carbonate; 6-iodocholestanyl phenyl carbonate; 6-iodocholestanyl phenyl carbonate; 5,6-di-iodocholestanyl tolyl carbonate; 5-iodocholestanol-9,10-di-iodostearate; and 5-iodocholestanyl-9,10-di-iodostearyl carbonate.

11. An article adapted to give a visual indication of electromagnetic radiation having a frequency in the range of $10^{17}$ to $10^{20}$ cycles per second incident thereon comprising a substrate, a layer of a cholesterogenic liquid crystal material that can exhibit the cholesteric phase deposited on the substrate, said layer containing an iodine compound.

12. The article of claim 11 wherein the article provides a black background.

13. The article of claim 11 wherein said cholesterogenic material is microencapsulated in a transparent protective material.

14. The article of claim 11 wherein said iodine compound is a derivative of a compound selected from the group consisting of cholesterol and cholestanol.

15. The article of claim 11 wherein said cholesterogenic material comprises an admixture of compounds including oleyl cholesteryl carbonate.

16. The article of claim 11 wherein said iodine compound has the formula

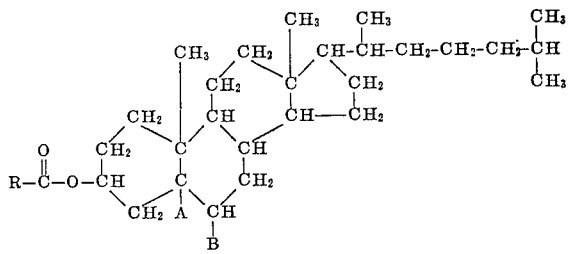

where A and B are elements selected from the group consisting of hydrogen and iodine and R is a radical selected from the group consisting of the aryl, iodoaryl, alkyl, iodoalkyl, alkaryl, iodoalkaryl, aralkyl, and iodoaralkyl radicals containing one to 27 carbon atoms and the aryloxy, iodoaryloxy, alkoxy, iodoalkoxy, alkaryloxy, iodoalkaryloxy, arylalkoxy, and iodoarylalkoxy radicals containing one to 27 carbon atoms, said compound containing at least one iodine atom.

17. The article of claim 17 wherein said iodine compound is a carbonate.

18. The article of claim 17 wherein said iodine compound is an ester.

19. The article of claim 11 wherein said iodine compound is selected from the group consisting of 3-iodocholestane; 5-iodocholestanol; 6-iodocholestanol; 5,6-di-iodocholestanol; 3,5,6-tri-iodocholestane; 3-iodocholesterol, 5,6-di-iodocholestanyl-9,10-di-iodostearate; 5-iodocholestanyl amyl carbonate; 6-iodocholestanyl phenyl carbonate; 6-iodocholestanyl phenyl carbonate; 5,6-di-iodocholestanyl tolyl carbonate; 5-iodocholestanol-9,10-di-iodostearate; and 5-iodocholestanyl-9,10-di-iodostearyl carbonate.

20. The article of claim 11 wherein the layer has a thickness of about 5–50 microns.

21. The article of claim 13 wherein the iodine compound is a derivative of a compound selected from the group consisting of cholesterol and cholestanol.

22. The article of claim 13 wherein the cholesterogenic material comprises oleyl cholesteryl carbonate.

23. The article of claim 11 irradiated with a dosage of X-ray radiation.

* * * * *